United States Patent
Yu

(10) Patent No.: US 12,163,554 B2
(45) Date of Patent: Dec. 10, 2024

(54) RAISING/LOWERING-TYPE BIAXIAL HINGE AND TERMINAL APPARATUS USING SAID RAISING/LOWERING-TYPE BIAXIAL HINGE

(71) Applicant: NATURALEZA-ONE CO., LTD., Yokohama (JP)

(72) Inventor: Yi-Hsien Yu, Taipei (TW)

(73) Assignee: NATURALEZA-ONE CO., LTD., Yokohama (JP)

( * ) Notice: Subject to any disclaimer, the term of this patent is extended or adjusted under 35 U.S.C. 154(b) by 0 days.

(21) Appl. No.: 17/915,953

(22) PCT Filed: Apr. 14, 2020

(86) PCT No.: PCT/JP2020/016466
§ 371 (c)(1),
(2) Date: Sep. 29, 2022

(87) PCT Pub. No.: WO2021/210075
PCT Pub. Date: Oct. 21, 2021

(65) Prior Publication Data
US 2023/0160417 A1 May 25, 2023

(51) Int. Cl.
*E05D 3/06* (2006.01)
*F16C 11/04* (2006.01)
(Continued)

(52) U.S. Cl.
CPC .............. *F16C 11/04* (2013.01); *E05D 3/122* (2013.01); *E05D 3/18* (2013.01); *E05Y 2999/00* (2024.05)

(58) Field of Classification Search
CPC ...... G06F 1/168; G06F 1/1681; G06F 1/1616; G06F 1/547; E05Y 2900/602;
(Continued)

(56) References Cited

U.S. PATENT DOCUMENTS 10,563,438 B1 * 2/2020 Chen ......................... E05D 5/10
10,824,197 B1 * 11/2020 Hsu ........................ G06F 1/1641
(Continued)

FOREIGN PATENT DOCUMENTS

CN 203979112 U * 12/2014
JP 2012502373 A 1/2012
(Continued)

OTHER PUBLICATIONS

International Search Report for corresponding PCT application No. PCT/JP2020/016466, mailed Jul. 7, 2020.

*Primary Examiner* — Chuck Y Mah
(74) *Attorney, Agent, or Firm* — Notaro, Michalos & Zaccaria P.C.

(57) ABSTRACT

A raising/lowering-type biaxial hinge for openably and closably coupling a first casing and a second casing in order that one type is compatible with terminal devices of different thicknesses is disclosed. The hinge is composed of a movable hinge shaft attached to a first casing, a fixed hinge shaft attached to a second casing, a first coupling member for movably coupling the movable hinge shaft and for rotatably bearing the fixed hinge shaft at a fixed position. A plurality of second coupling members for rotatably bearing the movable hinge shaft at a shift position and for movably coupling a first displaceable rotary shaft and a second displaceable rotary shaft is provided between the movable hinge shaft and the fixed hinge shaft.

8 Claims, 14 Drawing Sheets

(51) Int. Cl.
  *E05D 3/12* (2006.01)
  *E05D 3/18* (2006.01)
(58) Field of Classification Search
  CPC ......... E05Y 2900/606; E05Y 2800/205; E05Y
    2800/20; E05Y 2800/242; H04M 1/022;
    H04M 1/0214; H04M 1/0216; H04M
    1/0268; H04B 1/3833; E05D 3/12; E05D
    3/122; E05D 3/14; E05D 3/16; E05D
    3/06; E05D 11/06; E05D 1/00; E05D
    1/02; E05D 1/04; E05D 7/00; F16C 11/12
  See application file for complete search history.

(56) References Cited

U.S. PATENT DOCUMENTS

| | | | | |
|---|---|---|---|---|
| 11,035,160 | B2* | 6/2021 | Lin | G06F 1/1681 |
| 11,243,579 | B2* | 2/2022 | Liu | E05D 3/18 |
| 11,455,017 | B2* | 9/2022 | Liu | H04M 1/0268 |
| 2014/0174227 | A1* | 6/2014 | Hsu | E05D 3/14 |
| | | | | 74/98 |
| 2015/0184439 | A1* | 7/2015 | Hsu | G06F 1/16 |
| | | | | 16/350 |
| 2015/0245510 | A1* | 8/2015 | Hsu | H04M 1/022 |
| | | | | 16/250 |
| 2020/0241602 | A1* | 7/2020 | Ku | G06F 1/1618 |
| 2020/0256099 | A1* | 8/2020 | Lin | E05D 11/06 |
| 2020/0291702 | A1* | 9/2020 | Hsu | G06F 1/1681 |
| 2021/0096608 | A1* | 4/2021 | Hallar | E05D 11/1028 |
| 2021/0149454 | A1* | 5/2021 | Liu | F16C 11/04 |
| 2021/0337687 | A1* | 10/2021 | Chen | H05K 5/0226 |
| 2021/0355988 | A1* | 11/2021 | Cheng | G06F 1/1681 |
| 2022/0282754 | A1* | 9/2022 | Zhang | F16C 11/04 |

FOREIGN PATENT DOCUMENTS

| | | |
|---|---|---|
| JP | 2012129968 A | 7/2012 |
| JP | 2012251572 A | 12/2012 |
| JP | 2015155708 A | 8/2015 |
| JP | 2017510065 A | 4/2017 |
| JP | 2018010422 A | 1/2018 |
| JP | 2018132129 A | 8/2018 |
| JP | 2019035474 A | 3/2019 |

* cited by examiner

RAISING/LOWERING-TYPE BIAXIAL HINGE AND TERMINAL APPARATUS USING SAID RAISING/LOWERING-TYPE BIAXIAL HINGE

FIELD OF THE INVENTION

The invention relates to a raising/lowering-type biaxial hinge especially suitably used in a dual-screen foldable tablet with a keyboard, which is a kind of terminal device, and to the dual-screen foldable tablet with the keyboard, which further uses the raising/lowering-type biaxial hinge.

BACKGROUND ART

Among biaxial hinges used in a terminal device, such as a foldable notebook PC, an electronic dictionary or a PDA, the ones disclosed in Patent Documents 1 and 2 below are known.

BACKGROUND ART DOCUMENTS

Patent Documents

[Patent Document1] JP Laid-Open Patent Application No. 2018-10422
[Patent Document2] JP Laid-Open Patent Application No. 2019-35474

SUMMARY OF INVENTION

Problem to be Solved by the Invention

Each of conventional biaxial hinges as described above enables a first casing making up a keyboard portion and a second casing making up a display portion to be opened and closed 360 degrees assuring a free stop, but cannot adjust a shaft-to-shaft distance between a first hinge shaft and a second hinge shaft making up the biaxial hinge.

Recently, a dual-screen foldable tablet with a keyboard has been developed. This kind of terminal device is developed to ensure that a separate keyboard is prepared to enhance its user-friendliness, that this keyboard is placed on the first casing to allow for its use as in an ordinary PC with a keyboard, and that a keyboard panel is placed between a first casing and a second casing during its transport to allow for its movement.

In such a terminal device, its thickness varies with or without a keyboard panel, so that a biaxial hinge for enabling an adjustment of shaft-to-shaft distance between a first hinge shaft and a second hinge shaft of the biaxial hinge to make only one type of biaxial hinge compatible with both uses of the terminal device.

Therefore, an object of the invention is to provide a raising/lowering-type biaxial hinge configured to avoid troubles in its opening and closing operation even if a keyboard panel is placed on a first upper surface making up a terminal device, as well as a terminal device using this raising/lowering-type biaxial hinge.

Solution to Problem

To meet an object as mentioned above, a raising/lowering-type biaxial hinge according to claim 1 is characterized in that it is composed of a movable hinge shaft attached to a first casing side; a fixed hinge shaft attached to a second casing side; a first coupling member for movably coupling the movable hinge shaft and for rotatably bearing the fixed hinge shaft at a fixed position; a plurality of second coupling members for rotatably bearing the movable hinge shaft at a shift position and for movably coupling a first displaceable rotary shaft and a second displaceable rotary shaft provided between the movable hinge shaft and the fixed hinge shaft; a plurality of third coupling members for coupling the fixed hinge shaft and the first displaceable rotary shaft, the first displaceable rotary shaft and the second displaceable rotary shaft, and the second displaceable rotary shaft and the movable hinge shaft to avoid change in their respective shaft-to-shaft distances; and a synchronous rotation mechanism provided between the movable hinge shaft and the fixed hinge shaft on one hand, and between the first displaceable rotary shaft, and the second displaceable rotary shaft on the other.

Here, a raising/lowering-type biaxial hinge according to claim 2 is characterized in that a guide long hole into which a movable hinge shaft is slidably inserted and a first bearing hole in which a fixed hinge shaft is rotatably borne are provided on a first coupling member.

Further, a raising/lowering-type biaxial hinge according to claim 3 is characterized in that bent guide long holes into which a movable hinge shaft is slidably inserted and a second bearing hole in which a fixed hinge shaft is borne are provided on each of second coupling members.

Further, a raising/lowering-type biaxial hinge according to claim 4 is characterized in that a shaft-to-shaft distance stabilizing mechanism is provided, wherein it is made up of a pair of hook members attached to a movable hinge shaft and engaged with a fixed hinge shaft.

Further, a raising/lowering-type biaxial hinge according to claim 5 is characterized in that a synchronous rotation mechanism is made up of gears provided on a movable hinge shaft and a fixed hinge shaft, and meshed with each other.

Here, a raising/lowering-type biaxial hinge according to claim 6 is characterized in that friction torque generation mechanisms are provided on a movable hinge shaft and a fixed hinge shaft and a first displaceable rotary shaft, and a second displaceable rotary shaft.

Further, a raising/lowering-type biaxial hinge according to claim 7 is characterized in that each of friction torque generation mechanisms comprises friction washers and disc springs, wherein a movable hinge shaft and a fixed hinge shaft, and a first displaceable rotary shaft and a second displaceable rotary shaft are respectively inserted into both of these.

Next, the invention according to claim 8 is characterized in that a terminal device uses a raising/lowering-type biaxial hinge as described above.

Advantageous Effects of Invention

Following the invention according to claim 1, when a raising/lowering-type biaxial hinge according to the invention is used in a dual-screen foldable tablet being an example of a terminal device: when a first casing is opened relative to a second casing, a fixed hinge shaft is rotated to enable an opening and closing operation of the second casing via a second bracket; at the same time, a rotation of a fixed hinge shaft is transmitted from a first displaceable rotary shaft to a second displaceable rotary shaft and to a movable hinge shaft via a synchronous rotation mechanism, the first casing is opened in its opening direction opposite to an opening direction of the second casing, so that the first casing and the second casing are opened, with their opening and closing angle changing from 0 degree to 90 degrees, then from 90 degrees to 180 degrees, further from 180 degrees to 360 degrees.

Following the invention according to claim 2, a movable hinge shaft slides and moves inside a guide long hole relative to a fixed hinge shaft rotatably borne at a fixed position in a first bearing hole of a first coupling member to change a shaft-to-shaft distance between a fixed hinge shaft and a movable hinge shaft.

Further, a raising/lowering-type biaxial hinge according to claim 3 is characterized in that bent guide long holes into which a movable hinge shaft is slidably inserted and a second bearing hole in which a fixed hinge shaft is borne are provided on each of second coupling members.

Following the invention according to claim 4, hook members making up a shaft-to-shaft distance stabilizing mechanism can more securely prevent change in a shaft-to-shaft distance between a fixed hinge shaft and a movable hinge shaft.

Following the invention according to claim 5, a rotation drive force can be more securely transmitted from a fixed hinge shaft to a first displaceable rotary shaft and from a second displaceable rotary shaft to a movable hinge shaft, or inversely, than a synchronous rotation mechanism using gears.

Following the invention according to one of claims 6 and 7, a friction torque is generated at the time of respective rotations of a movable hinge shaft, a fixed hinge shaft, a first displaceable rotary shaft and a second displaceable rotary shaft, a first casing and a second casing can be stopped assuring a free stop during their opening and closing operation, and a display portion installed on a second casing side can be held to avoid a change in opening and closing angle, even if it is touched by a finger or a stylus.

Following the invention according to claim 8, a terminal device comprising a raising/lowering-type biaxial hinge having features as described above can be provided.

DESCRIPTION OF EMBODIMENTS

In the following, reference is made to a raising/lowering-type biaxial hinge according to the invention as applied to a terminal device being a dual-screen foldable tablet comprising a first casing and a second casing; but examples of a terminal device to which the invention is applied include terminal devices such as notebook type PC, laptop type PC and PDAs in particular an electronic dictionary. Furthermore, it can be also used in various devices or containers in which a first casing and a second casing are openably and closably coupled by a raising/lowering-type biaxial hinge.

Embodiment 1

Figure 1A:
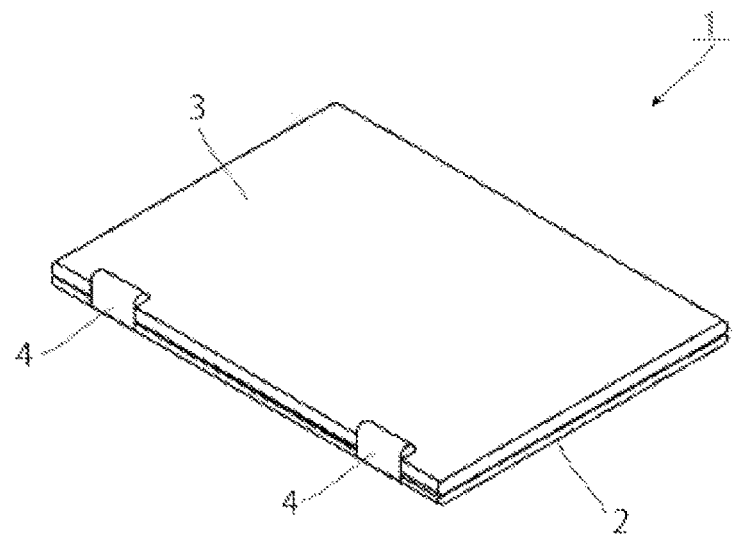
FIG. 1A to FIG. 1C show a dual-screen foldable tablet being an example of a terminal device using a raising/lowering-type biaxial hinge according to the invention, FIG. 1A being a perspective view of its closed state, FIG. 1B its side view, and FIG. 1C a side view of its opened state at 90 degrees.
Figure 1B:
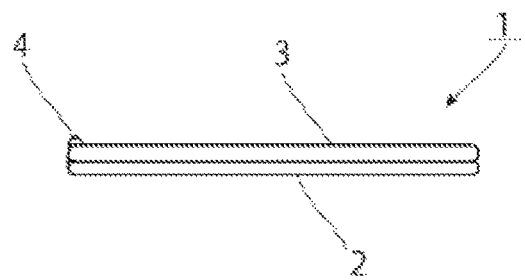
Figure 1C:
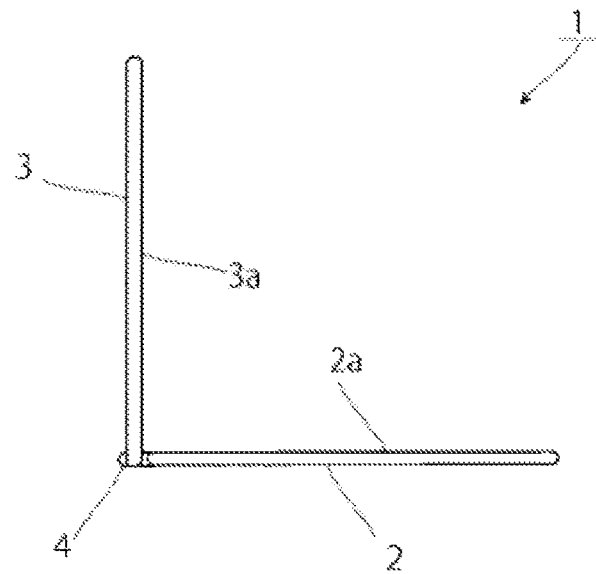
Figure 13A:
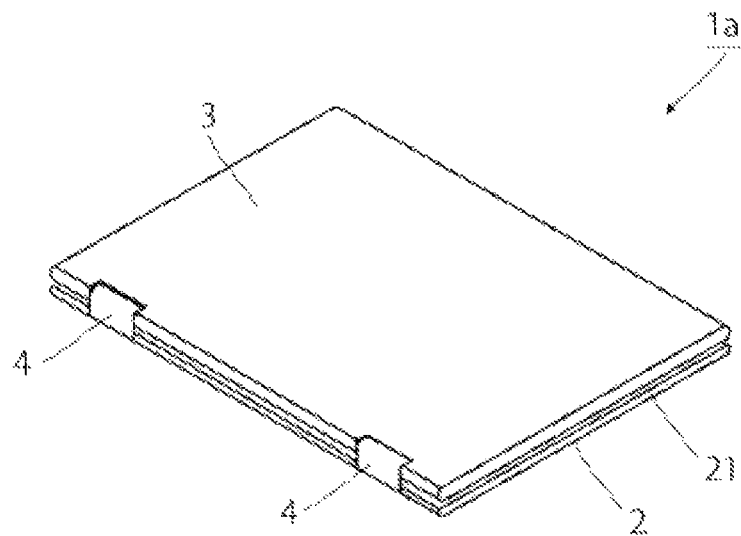
FIG. 13A to FIG. 13C show another terminal device using a raising/lowering-type biaxial hinge according to the invention, FIG. 13A being a perspective view of its closed state, FIG. 13B its side view, and FIG. 13C a side view of its opened state at 90 degrees.
Figure 13B:
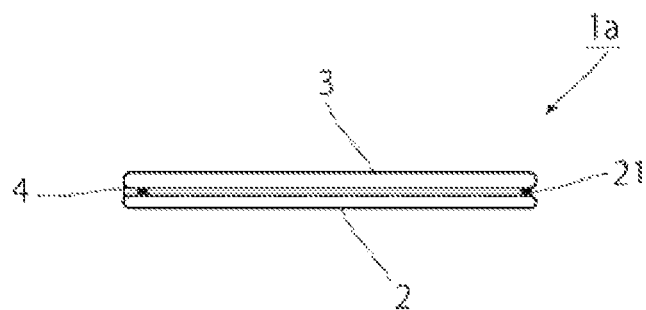
Figure 13C:
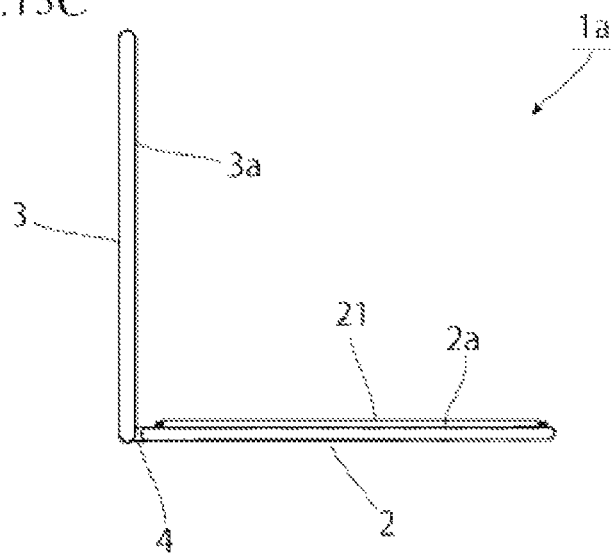

A terminal device 1 to which the invention is applied, especially that in Embodiment 1 is a dual-screen foldable tablet comprising a first casing 2 provided with a first display portion 2a and a second casing 3 provided with a second display portion 3a as shown in FIGS. 1A to 1C; additionally it comprises a separate keyboard panel 21, and the terminal device 1 can be carried together with the keyboard panel 21 as placed between the first casing 2 and the second casing 3, as shown in FIG. 13A to FIG. 13C.

A pair of raising/lowering-type biaxial hinges 4, 4 are configured to ensure that no problem occurs, even if a first casing 2 and a second casing 3 are closed as a keyboard panel 21 is placed between the first casing 2 and the second casing 3; raising/lowering-type biaxial hinges 4, 4 are attached at a predetermined interval on the right and left on respective rear end portions of the first casing 2 and the second casing 3. The first casing 2 and the second casing 3 are coupled by the raising/lowering-type biaxial hinges 4, 4 to be openable and closable relative to each other. In other words, a terminal device 1 is configured to ensure that the first casing 2 and the second casing 3 can be opened from a closed state of 0 degree to a fully-opened state, having an angle of e.g. 90 degrees, 180 degrees, 270 degrees and 360 degrees and also restore the closed state of 0 degree from 360 degrees, having an angle of e.g. 270 degrees, 180 degrees, 90 degrees and then 0 degree, and that the first casing 2 and the second casing 3 can be opened and closed from 0 degree to 360 degrees, even if the first casing 2 and the second casing 3 are closed, as the keyboard panel 21 is placed between the first casing 2 and the second casing 3.

A first display portion 2a and a second display portion 3a have a function of enabling touch input operations by a finger, etc. on a screen, in addition to that of displaying a calculated image. In this embodiment, as a pair of raising/lowering-type biaxial hinges 4, 4 having the same structure are provided on the right and left, reference is made in the following to a raising/lowering-type biaxial hinge 4 on the right in FIG. 1A, and a raising/lowering-type biaxial hinge 4 on the left is not described.

Figure 2:
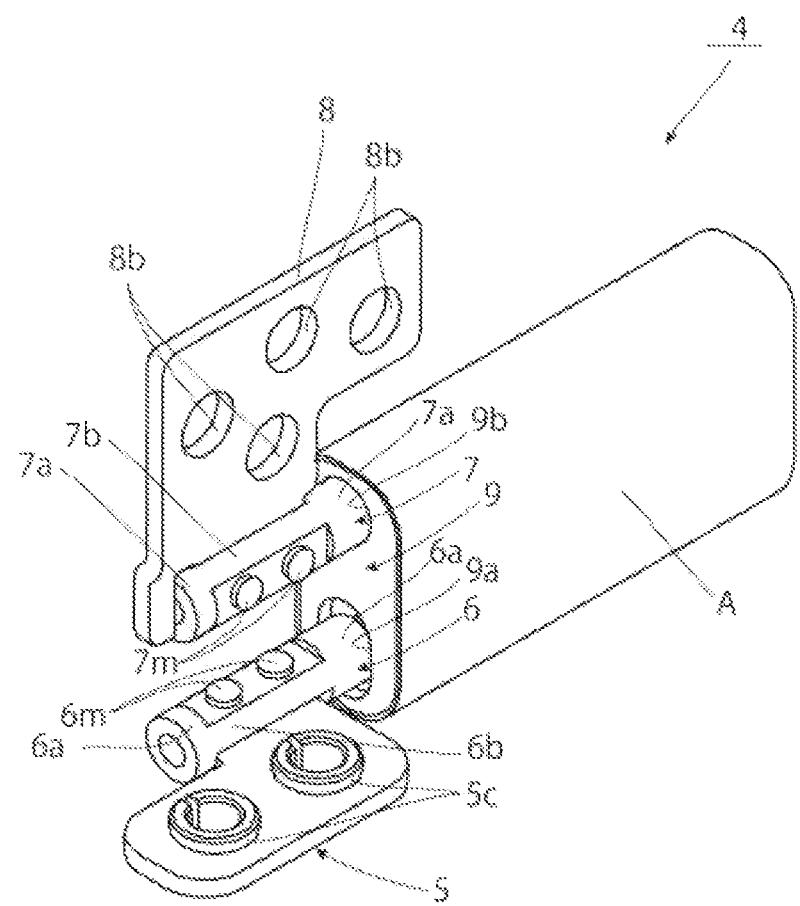
FIG. 2 shows a perspective view of a raising/lowering-type biaxial hinge according to the invention.
Figure 3:
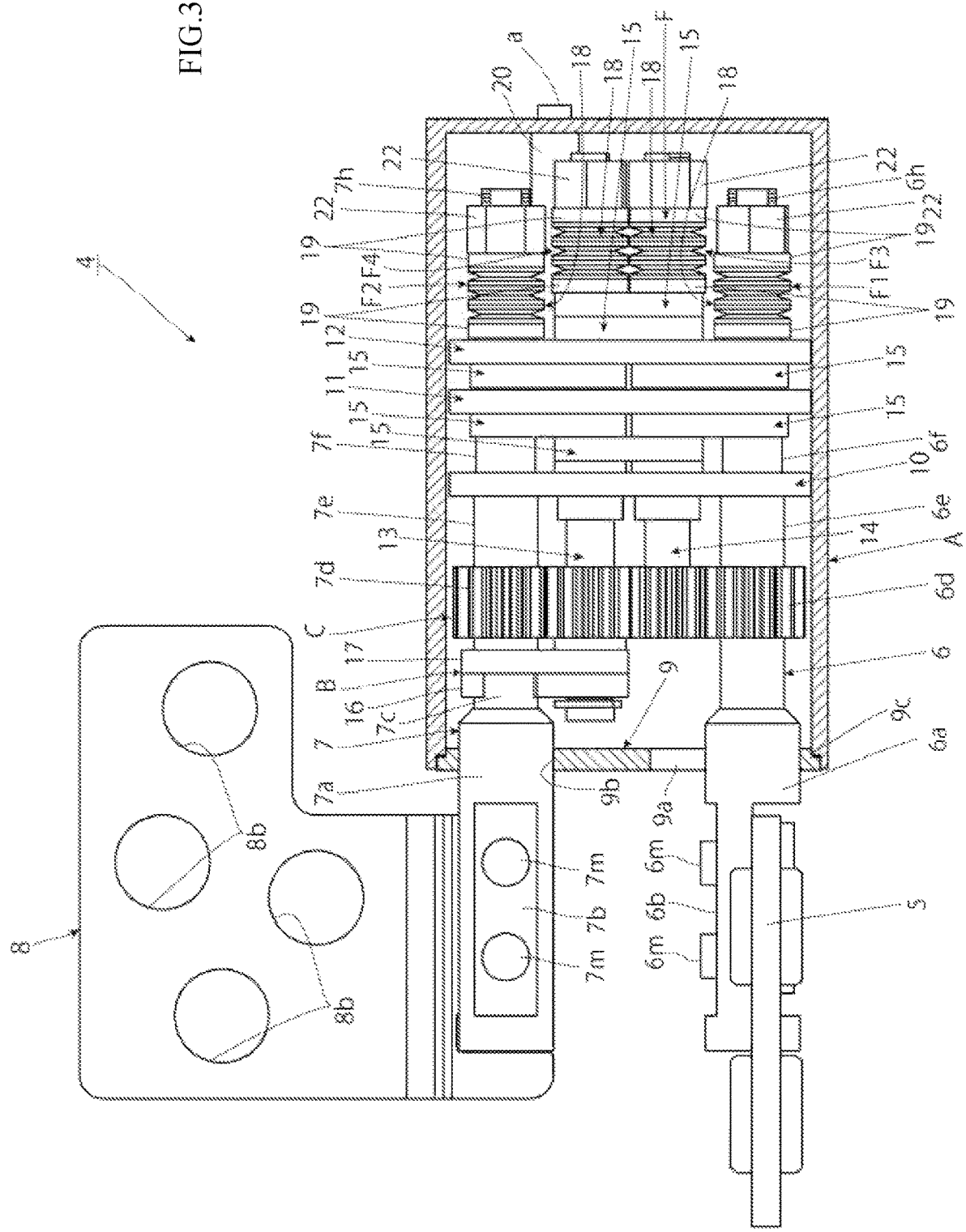
FIG. 3 shows a plan view with a partial cross section of a raising/lowering-type biaxial hinge as shown in FIG. 2.
Figure 4:
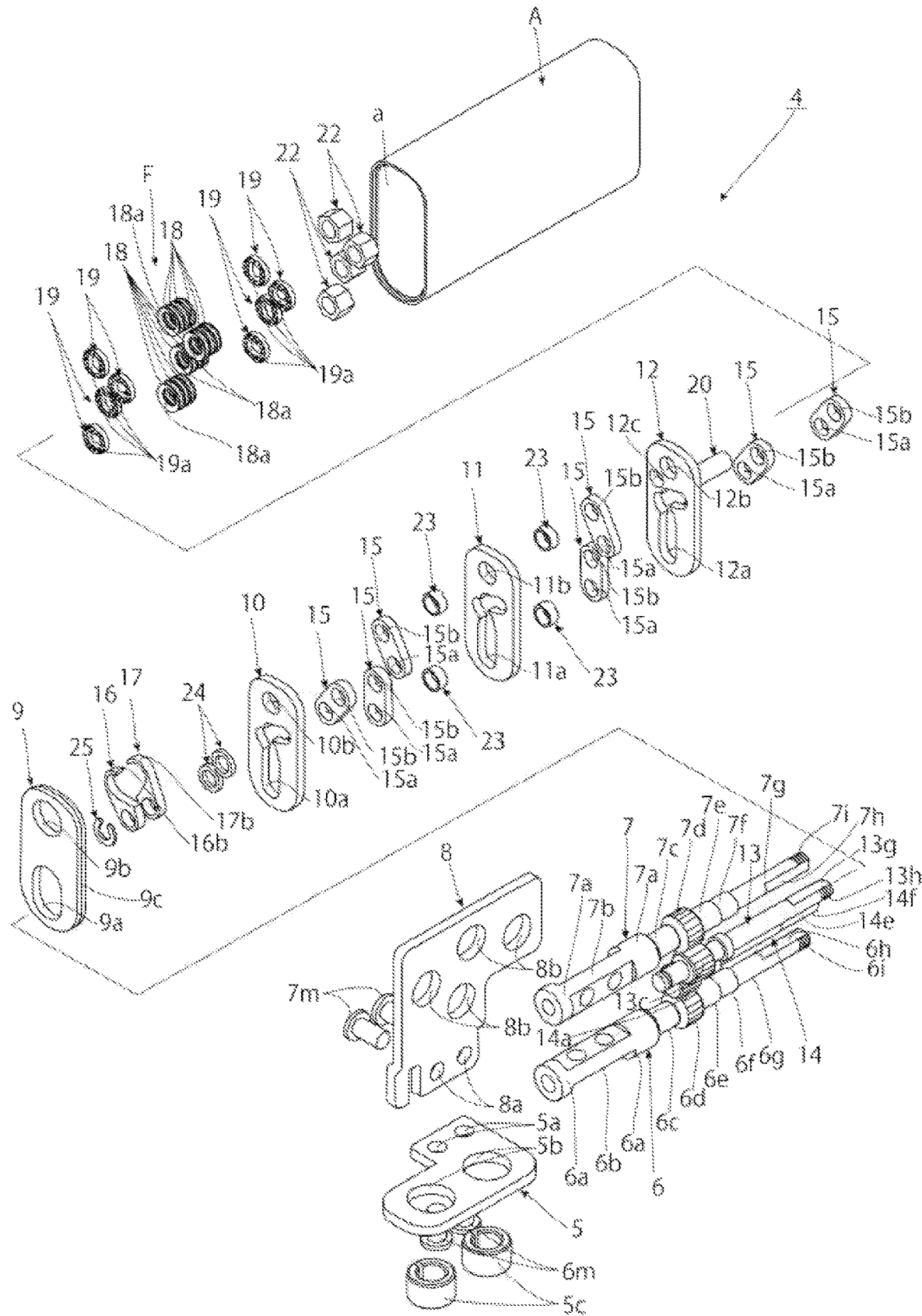
FIG. 4 shows an exploded perspective view of a raising/lowering-type biaxial hinge as shown in FIG. 2.

A raising/lowering-type biaxial hinge 4 as described above is housed inside a case portion A, especially as shown in FIG. 2 to FIG. 4, while respective portions of a movable hinge shaft 6 and a fixed hinge shaft 7, as well as a first bracket 5 and a second bracket 8 project outside.

Figure 11A:
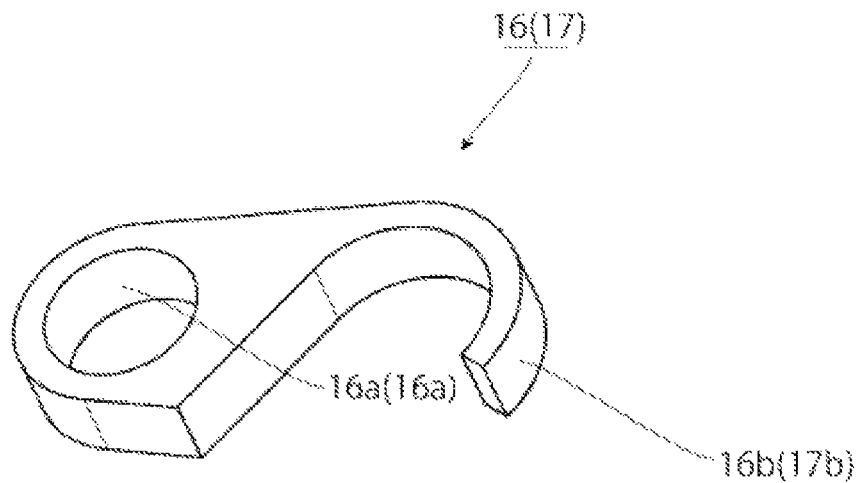
FIG. 11A and FIG. 11B show a shaft-to-shaft distance stabilizing mechanism of a raising/lowering-type biaxial hinge as shown in FIG. 3 and FIG. 4, FIG. 11A being a perspective view of a hook member, and FIG. 11B its plan view with a partial cross section.
Figure 11B:
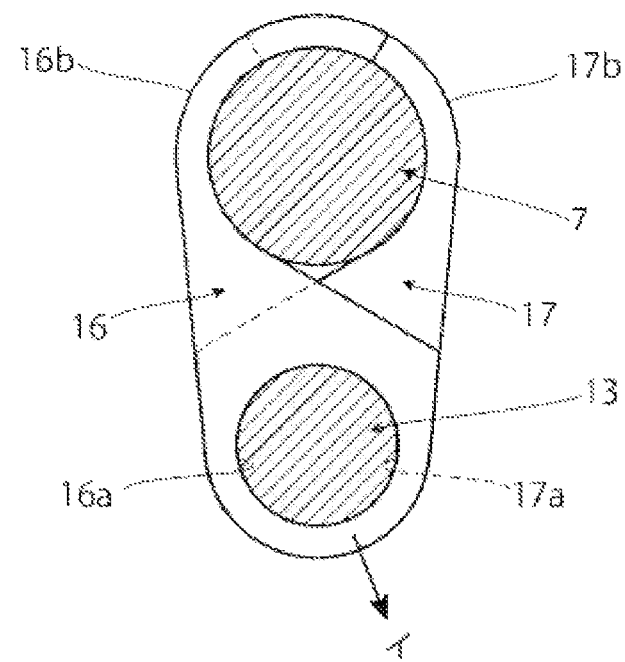

FIG. 3, FIGS. 11A and 11B show a concrete structure of a raising/lowering-type biaxial hinge 4 as described above, and as shown in respective drawings, the raising/lowering-type biaxial hinge 4 comprises a movable hinge shaft 6 attached via a first bracket 5 to a first casing 2 on which a first display portion 2a is installed; a fixed hinge shaft 7 attached via a second bracket 8 to a second casing 3 on which a second display portion 3a is installed; a guide long hole 9a for movably bearing the movable hinge shaft 6; a first coupling member 9 comprising a first bearing hole 9b for rotatably pivotally supporting the fixed hinge shaft 7 at a fixed position; three second coupling members, i.e. a second A coupling member 10, a second B coupling member 11 and a second C coupling member 12, respectively comprising bent guide long holes 10a, 11a, 12a for movably and rotatably bearing the movable hinge shaft 6 and second bearing holes 10b, 11b, 12b for rotatably bearing the fixed hinge shaft 7 at a fixed position; seven third coupling members 15, 15, 15 . . . for coupling the movable hinge shaft 6 and the fixed hinge shaft 7, as well as a first displaceable rotary shaft 13 and the second displaceable rotary shaft 14 to avoid changes in their respective shaft-to-shaft distances; a shaft-to-shaft distance stabilizing mechanism B provided between the movable hinge shaft 6 and the first displaceable rotary shaft 13; and a synchronous rotation mechanism C provided between the first displaceable rotary shaft 13 and the second displaceable rotary shaft 14.

Still further, a first friction torque generation mechanism F1, a second friction torque generation mechanism F2, a third friction torque generation mechanism F3 and a fourth friction torque generation mechanism F4 can be respectively provided on a movable hinge shaft 6, a fixed hinge shaft 7, a first displaceable rotary shaft 13 and a second displaceable rotary shaft 14. It is noted that in this specification and claims, the first friction torque generation mechanism F1, the second friction torque generation mechanism F2, the third friction torque generation mechanism F3 and the fourth friction torque generation mechanism F4 are collectively referred to as friction torque generation mechanisms F. Still further, the number of respective friction torque generation mechanisms F is not limited to that in Embodiments. These can be provided on some of a movable hinge shaft 6, a fixed hinge shaft 7, a first displaceable rotary shaft 13 and a second displaceable rotary shaft 14.

In the following, reference is made to respective members in order. It is noted that in what follows, a movable hinge shaft 6, a fixed hinge shaft 7, a first displaceable rotary shaft 13 and a second displaceable rotary shaft 14 are collectively referred to as respective shafts.

Figure 5A:
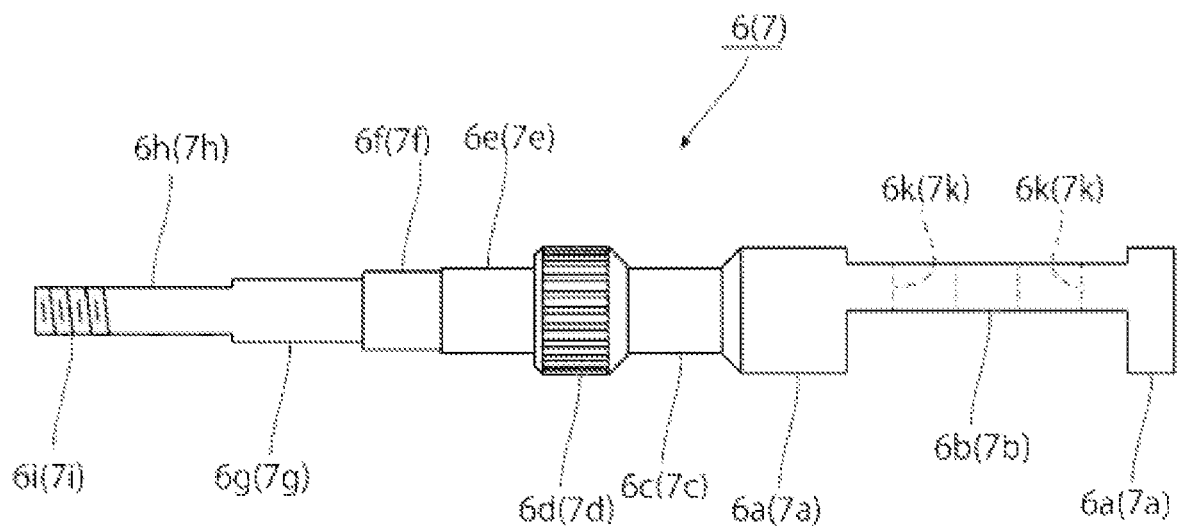
FIG. 5A and FIG. 5B show a movable hinge shaft and a fixed hinge shaft of a raising/lowering-type biaxial hinge as shown in FIG. 3 and FIG. 4, FIG. 5A being its elevation view, and FIG. 5B its plan view.
Figure 5B:
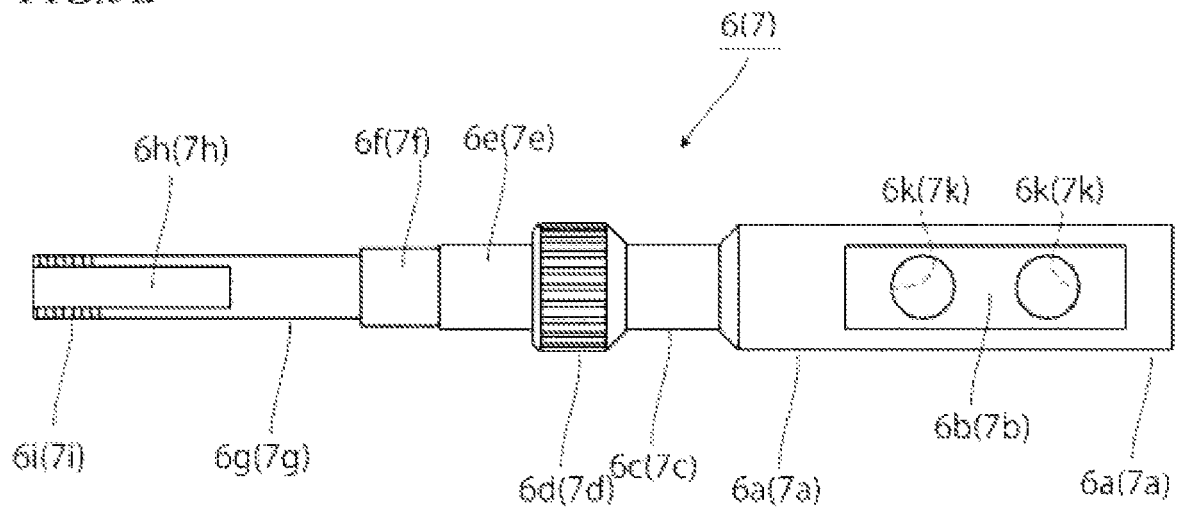

First, especially as shown in FIGS. 5A and 5B, a movable hinge shaft 6 comprises, as seen from its one end portion, an attaching flat portion 6b comprising flange portions 6a, 6a on its both end portions and formed by slicing off a section between these flange portions 6a, 6a; a first small diameter portion 6c provided next to the attaching flat portion 6b and having a circular cross section; a first gear portion 6d provided next to the first small diameter portion 6c and having a diameter larger than the first small diameter portion 6c; a second small diameter portion 6e provided next to the first gear portion 6d; a third small diameter portion 6f provided next to the second small diameter portion 6e; a fourth small diameter portion 6g provided next to the third small diameter portion 6f; a deformed shaft portion 6h provided from the middle of the fourth small diameter portion 6g; and a male screw portion 6i provided on one end portion of the deformed shaft portion 6h.

It is noted that a plurality of attaching holes 6k, 6k . . . are provided on an attaching flat portion 6b of a movable hinge shaft 6, and a first bracket 5 is fixedly attached by attaching screws 6m, 6m . . . passing through these attaching holes 6k, 6k . . . ; as it is structured in a well-known manner, it is not concretely shown in the drawings, but a rear end portion of a first casing 2 is attached to the first bracket 5. As per attaching holes provided on the first bracket 5, reference numerals 5a, 5a denote the ones for attaching via the attaching screws 6m, 6m . . . to the movable hinge shaft 6, while reference numerals 5b, 5b denote the ones for attaching using the attaching screws (not shown) to the first casing 2. It is noted that reference numerals 5c, 5c denote spacers.

Next, a fixed hinge shaft 7 is of the same structure as a movable hinge shaft 6; as is equally shown by reference numerals in parentheses in FIGS. 5A and 5B, it comprises an attaching flat portion 7b comprising flange portions 7a, 7a on its both end portions and formed by slicing off a section between these flange portions 7a, 7a; a first small diameter portion 7c provided next to the attaching flat portion 7b and having a circular cross section; a first gear portion 7d provided next to the first small diameter portion 7c and having a diameter larger than the first small diameter portion 7c; a second small diameter portion 7e provided next to the first gear portion 7d; a third small diameter portion 7f provided next to the second small diameter portion 7e; a fourth small diameter portion 7g provided next to the third small diameter portion 7f; a deformed shaft portion 7h provided from the middle of the fourth small diameter portion 7g; and a male screw portion 7i provided on one end portion of the deformed shaft portion 7h.

It is noted that a second bracket 8 is fixedly attached to an attaching flat portion 7b of a fixed hinge shaft 7 by attaching screws 7m, 7m . . . passing through a plurality of attaching holes 8a, 8a . . . provided on it; as it is structured in a well-known manner, it is not concretely shown in the drawings, but a rear end portion of a second casing 3 is attached to the second bracket 8. Reference numerals 8b, 8b . . . on the second bracket 8 denote attaching holes for attaching using attaching screws (not shown) to the second bracket 8.

Figure 6:
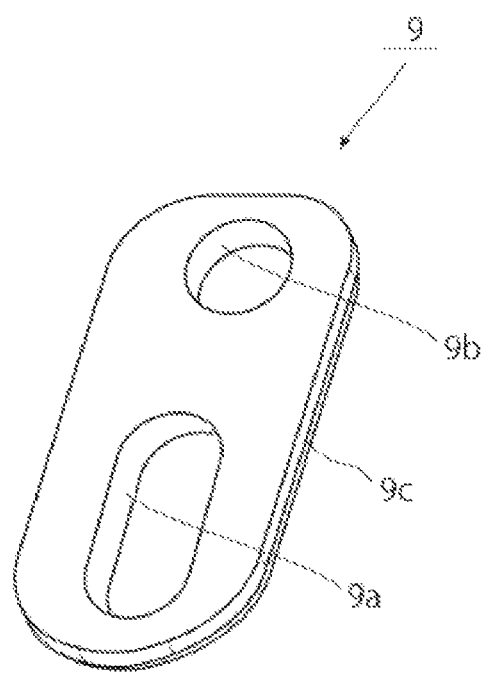
FIG. 6 shows a perspective view of a first coupling member of a raising/lowering-type biaxial hinge as shown in FIG. 3 and FIG. 4.

Next, a first coupling member 9 is a single plate-like article having a substantially oval form in plan view, as shown in FIG. 4 and FIG. 6, wherein a guide long hole 9a for movably bearing flange portions 6a of a movable hinge shaft 6 is provided on its one end portion, and a first bearing hole 9b for rotatably bearing flange portions 7a of a fixed hinge shaft 7; the first coupling member 9 has an insertion convex portion 9c on its one end surface, and as shown in FIG. 4, it also functions as a lid body for a case portion A at the same time by fitting the insertion convex portion 9c into an inlet of the case portion A.

Figure 7A:
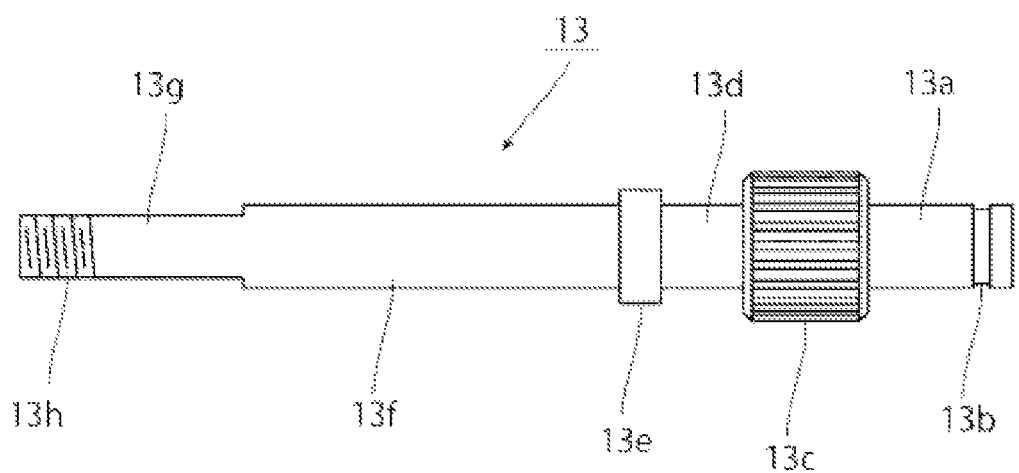
FIG. 7A and FIG. 7B show a first displaceable rotary shaft of a raising/lowering-type biaxial hinge as shown in FIG. 3 and FIG. 4, FIG. 7A being its elevation view, and FIG. 7B its plan view.
Figure 7B:
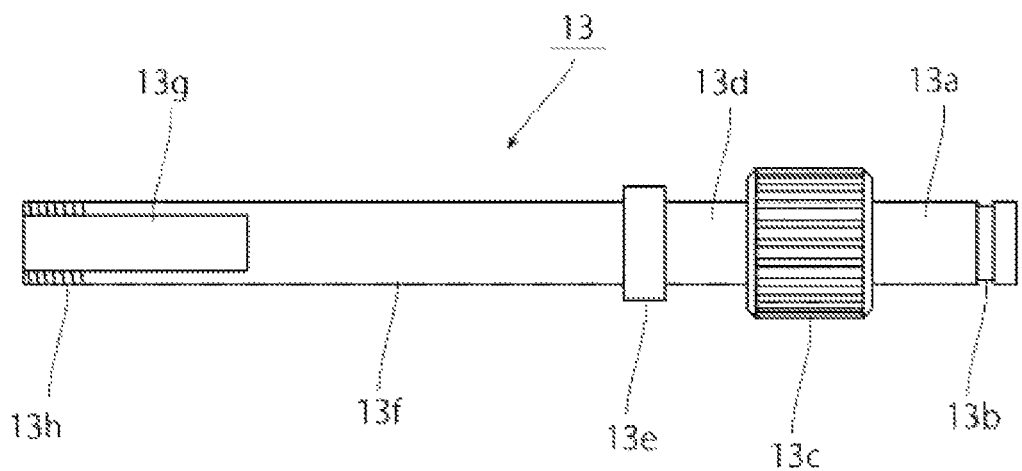

Especially as shown in FIG. 4, FIGS. 7A and 7B, a first displaceable rotary shaft 13 comprises a first small diameter portion 13a provided with a circumferential groove 13b on its end portion; a third gear portion 13c provided next to the first small diameter portion 13a; a second small diameter portion 13d provided next to the first gear portion 13c; a flange portion 13e of a slightly larger diameter provided next to the second small diameter portion 13d; a long third small diameter portion 13f provided next to the flange portion 13e; a deformed shaft portion 13g provided on the third small diameter portion 13f; and a male screw portion 13h provided on the deformed shaft portion 13g.

Figure 8A:
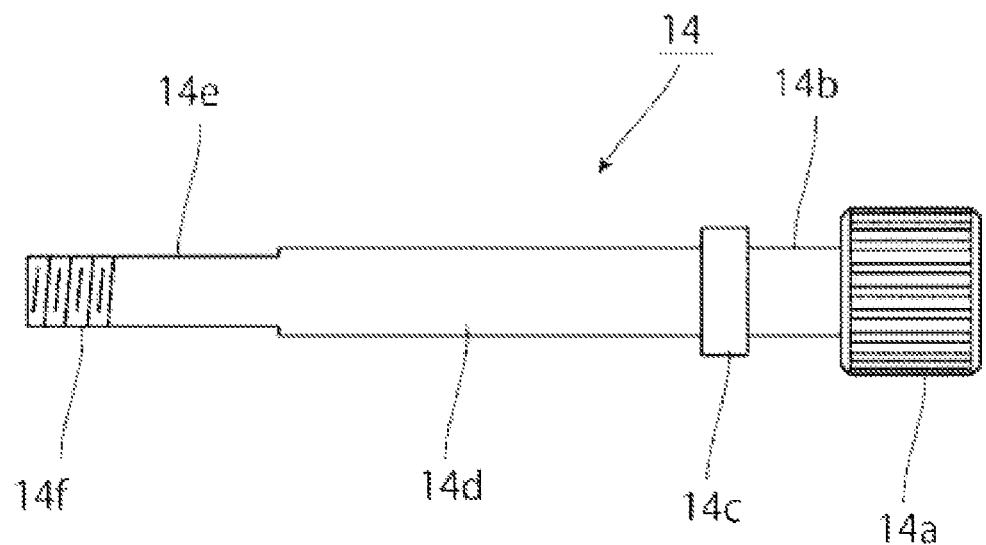
FIG. 8A and FIG. 8B show a second displaceable rotary shaft of a raising/lowering-type biaxial hinge as shown in FIG. 3 and FIG. 4, FIG. 8A being its elevation view, and FIG. 8B its plan view.
Figure 8B:
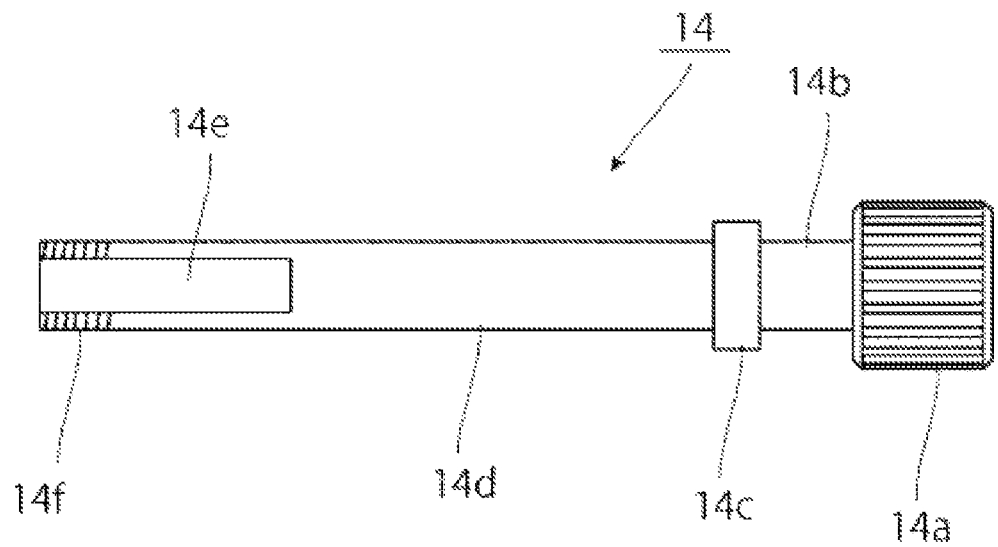

Especially as shown in FIG. 4, FIGS. 8A and 8B, a second displaceable rotary shaft 14 comprises a fourth gear portion 14a provided on its end portion; a first small diameter portion 14b provided next to the fourth gear portion 14a; a flange portion 14c of a slightly larger diameter provided next to the first small diameter portion 14b; a long second small diameter portion 14d provided next to the flange portion 14c; a deformed shaft portion 14e provided next to the second small diameter portion 14d; and a male screw portion 14f provided on the deformed shaft portion 14e.

Figure 9A:
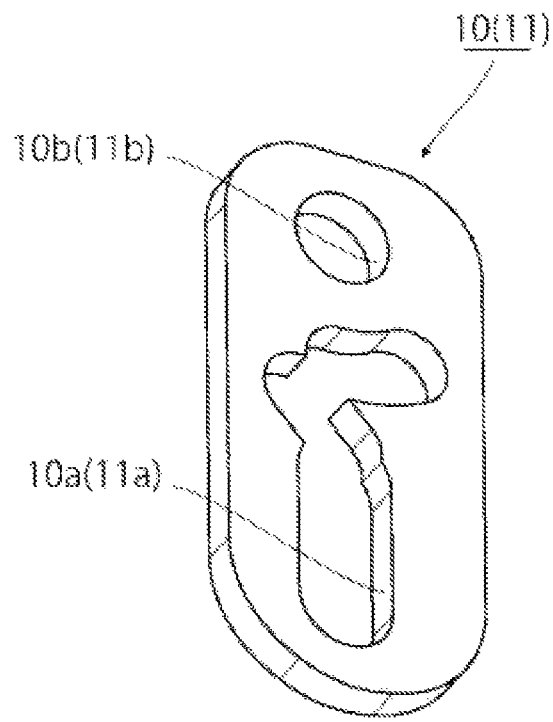
FIG. 9A and FIG. 9B show second coupling members of a raising/lowering-type biaxial hinge as shown in FIG. 3 and FIG. 4, FIG. 9A being a perspective view of a second A coupling member and a second B coupling member, and FIG. 9B a perspective view of a second C coupling member.
Figure 9B:
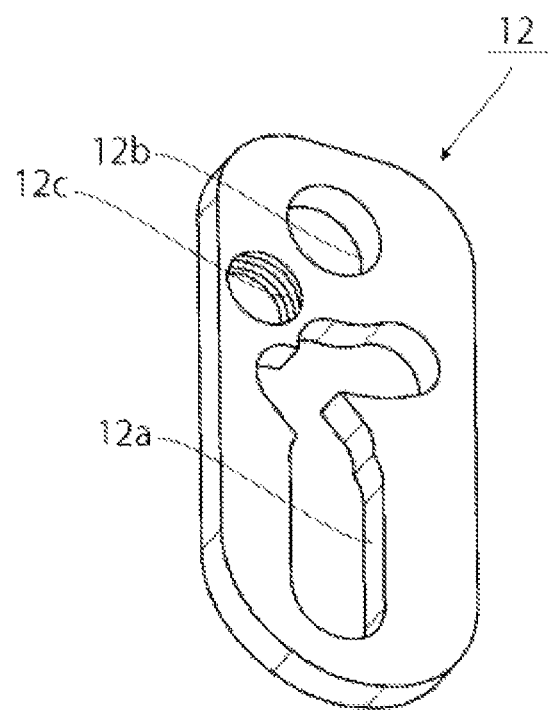

Next, especially as shown in FIG. 3, FIG. 4, FIGS. 9A and 9B, second coupling members are composed of three second coupling members, i.e. a second A coupling member 10, a second B coupling member 11 and a second C coupling member 12 arranged at predetermined intervals on an inner side from a first coupling member 9, i.e. on the side located inside a case portion A; as shown in FIG. 9A, the second A coupling member 10 and the second B coupling member 11 have the same structure, while a female screw hole 12c to which an attaching rod 20 is attached is provided on the second C coupling member 12 as shown in FIG. 4 and FIG. 9B. The attaching rod 20 fixes a raising/lowering-type biaxial hinge 4 to the case portion A; its one end portion side is fixed by screw to the second C coupling member 12, while its free end side is fixed by an attaching screw a to a side plate portion of the case portion A. Moreover, three second coupling members in total, i.e. the second A coupling member 10, the second B coupling member 11 and the second C coupling member 12 are provided in this Embodiment, but their number is not limited.

Especially as shown in FIG. 9A, a second A coupling member 10 and a second B coupling member 11 are plate-like articles having a size and shape having their outer circumferences in contact with the inner surface of a case portion A over its overall circumference; these respectively comprise bent guide long holes 10a, 11a for movably bearing a second small diameter portion 6e of a movable hinge shaft 6, as well as a first displaceable rotary shaft 13 and a second displaceable rotary shaft 14; and second bearing holes 10b, 11b respectively provided facing these bent guide long holes 10a, 11a for bearing and rotatably pivotally supporting a fixed hinge shaft 7 at a fixed position.

Especially as shown in FIG. 9B, a second C coupling member 12 is a plate-like element having a size and shape having its outer circumference in contact with the inner surface of a case portion A over its overall circumference; it comprises a bent guide long hole 12a for movably bearing a second small diameter portion 6e of a movable hinge shaft 6, as well as a first displaceable rotary shaft 13 and a second displaceable rotary shaft 14; a second bearing hole 12b provided facing this bent guide long hole 12a for bearing and rotatably pivotally supporting a fixed hinge shaft 7 at a fixed position; and a female screw hole 12c for fixing a rod 20 by screw.

Figure 10:
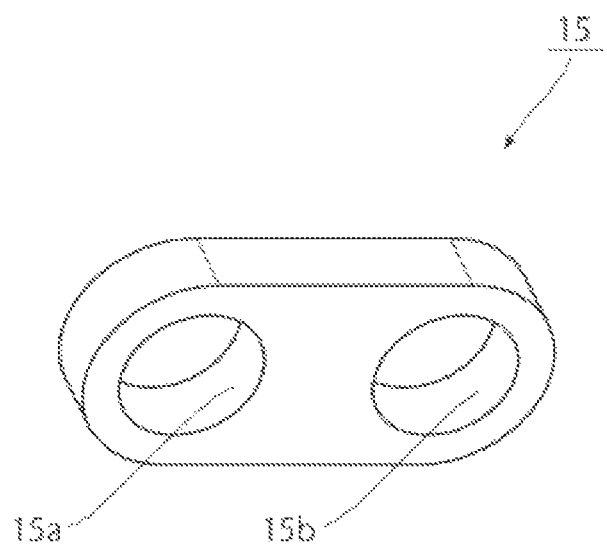
FIG. 10 shows a perspective view of a third coupling member of a raising/lowering-type biaxial hinge as shown in FIG. 3 and FIG. 4.

Especially as shown in FIG. 3, FIG. 4 and FIG. 10, third coupling members 15 are made up of seven elements having the same shape; they are configured to prevent the change in shaft-to shaft distances between a movable hinge shaft 6 and a first displaceable rotary shaft 13, between this first displaceable rotary shaft 13 and a second displaceable rotary shaft 14, as well as between this second displaceable rotary shaft 14 and a fixed hinge shaft 7. These third coupling members 15, 15 . . . are a plate-like elements having an oval shape in plan view, similar to remaining a first coupling member 9, a second A coupling member 10, a second B coupling member 11 and a second C coupling member 12, but smaller than these; the third coupling members 15, 15 . . . are composed of seven such elements in total, but their number is not limited. Especially as in FIG. 10, where one representative of these third coupling members 15, 15 . . . is enlarged and shown, each two coupling holes 15a, 15a . . . and coupling holes 15b, 15b . . . are provided on it. Though not shown in detail, inner diameters of respective coupling holes 15a, 15a . . . and coupling holes 15b, 15b . . . are different in accordance with outer diameters of respective shaft portions of a movable hinge shaft 6, a fixed hinge shaft 7, a first displaceable rotary shaft 13, and a second displaceable rotary shaft 14, which are coupled to these holes.

As shown in FIG. 4, FIGS. 11A and 11B, a shaft-to-shaft distance stabilizing mechanism B between a movable hinge shaft 6 and a fixed hinge shaft 7 is made up of a pair of hook members 16, 17. As in FIGS. 11A and 11B, where one of them is enlarged and shown, these hook members 16, 17 respectively comprise coupling holes 16a, 17a and hook portions 16b, 17b; and these hook portions 16b, 17b always crossing each other hold a first small diameter portion 7c of the fixed hinge shaft 7.

A synchronous rotation mechanism C for synchronously rotating a movable hinge shaft 6, a fixed hinge shaft 7, a first displaceable rotary shaft 13 and a second displaceable rotary shaft 14 is made up of third coupling members 15, 15 . . . as described above, as well as of a first gear portion 6d, a second gear portion 7d, a third gear portion 13c and a fourth gear portion 14a, wherein these gear portions are respectively provided on the movable hinge shaft 6, the fixed hinge shaft 7, the first displaceable rotary shaft 13 and the second displaceable rotary shaft 14 to mesh with each other, as shown in FIG. 3 and FIG. 4. Outer diameters and gear ratios of these respective gear portions 6d, 7d, 13c, 14a may vary from one another. Moreover, this synchronous rotation mechanism C is not limited to the one in Embodiment, but can be replaced with the one using a belt.

Friction torque generation mechanisms F are of known structure, and as shown in FIG. 3 and FIG. 4, made up of a first friction torque generation mechanism F1, a second friction torque generation mechanism F2, a third friction torque generation mechanism F3 and a fourth friction torque generation mechanism F4 respectively provided on a movable hinge shaft 6, a fixed hinge shaft 7, a first displaceable rotary shaft 13 and a second displaceable rotary shaft 14, and these are respectively made up of disc springs 18, 18, 18, 18 through which respective shafts (the movable hinge shaft 6, the fixed hinge shaft 7, the first displaceable rotary shaft 13 and the second displaceable rotary shaft 14) are inserted; friction washers 19, 19; 19, 19; 19, 19; 19, 19, wherein one pair each of these is provided for each disc spring 18, 18, 18, 18 to sandwich the latter; and fastening nuts 22, 22, 22, 22 screwed with respective male screw portions 6i, 7i, 13h, 14f of the respective shafts (the movable hinge shaft 6, the fixed hinge shaft 7, the first displaceable rotary shaft 13 and the second displaceable rotary shaft 14). Insertion holes 19a, 19a; 19a, 19a; 19a, 19a; 19a, 19a provided on respective friction washers 19, 19; 19, 19; 19, 19; 19, 19 are deformed holes engaged with respective deformed shaft portions 6h, 7h, 13g, 14e of the respective shafts (the movable hinge shaft 6, the fixed hinge shaft 7, the first displaceable rotary shaft 13 and the second displaceable rotary shaft 14); and respective insertion holes 18a of respective disc springs 18, 18, 18, 18 are all circular, though not shown. For the rest, in FIG. 3 and FIG. 4 reference numerals 23, 23; 23, 23 denote spacer rings, while reference numerals 24, 24 washers. It is noted that the first friction torque generation mechanism F1, the second friction torque generation mechanism F2, the third friction torque generation mechanism F3 and the fourth friction torque generation mechanism F4 are simply referred to as friction torque generation mechanisms, as stated above.

Next, reference is made to an arrangement of each of a first coupling member 9, second coupling members 10, 11, 12 and third coupling members 15, 15 . . . . . Especially as shown in FIG. 2 to FIG. 4 and FIG. 6, the first coupling member 9 first also functions as a lid body for a case portion A; and a guide long hole 9a and a first bearing hole 9b of the first coupling member 9 bear respective flange portions 6a, 7a of a movable hinge shaft 6 and a fixed hinge shaft 7. Three second coupling members, i.e. a second A coupling member 10, a second B coupling member 11 and a second C coupling member 12 are installed at predetermined intervals on a rear side of the first coupling member 9, i.e. on the left side especially as in FIG. 3; respective small diameter portions 6f, 7f of a movable hinge shaft 6 and a fixed hinge shaft 7 are inserted into bent guide long holes 10a, 11a, 12a and second bearing holes 10b, 11b, 12b provided on these second coupling members. Each of a third small diameter portion 13f and a second small diameter portion 14d of a first displaceable rotary shaft 13 and a second displaceable rotary shaft 14 are displaceably coupled and borne by these bent guide long holes 10a, 11a, 12a.

A movable hinge shaft 6 and a second displaceable rotary shaft 14, the second displaceable rotary shaft 14 and a first displaceable rotary shaft 13, as well as a second displaceable rotary shaft 13 and a fixed hinge shaft 7 are respectively coupled to each other by third coupling members 15, 15, 15, 15, and configured to avoid a change in mutual shaft-to-shaft distances.

Next, reference is made to the operation of respective components and mechanisms of the raising/lowering-type biaxial hinge 4 according to the invention, and particularly to the case that it is used in the dual-screen foldable tablet-type terminal device 1 shown in FIG. 1, wherein both of the display portions 1a, 2b are installed on the first casing 2 and the second casing 3.

Figure 12A:
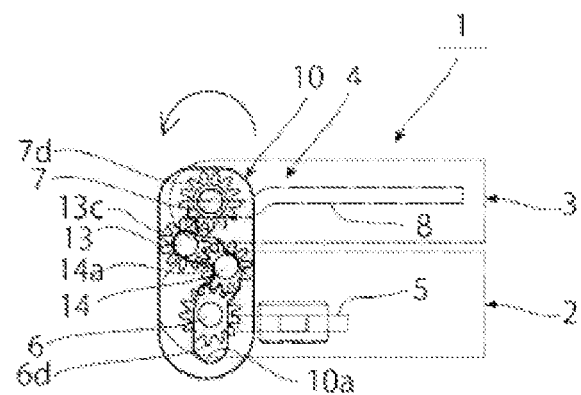
FIG. 12A to FIG. 12D are illustrative views showing an operation of a raising/lowering-type biaxial hinge as shown in FIG. 3 and FIG. 4, FIG. 12A showing a closed state in which a first casing and a second casing are at 0 degree, FIG. 12B a state in which they are opened 80 degrees, FIG. 12C a state in which they are opened 180 degrees and FIG. 12D a state in which they are opened 360 degrees.
Figure 12B:
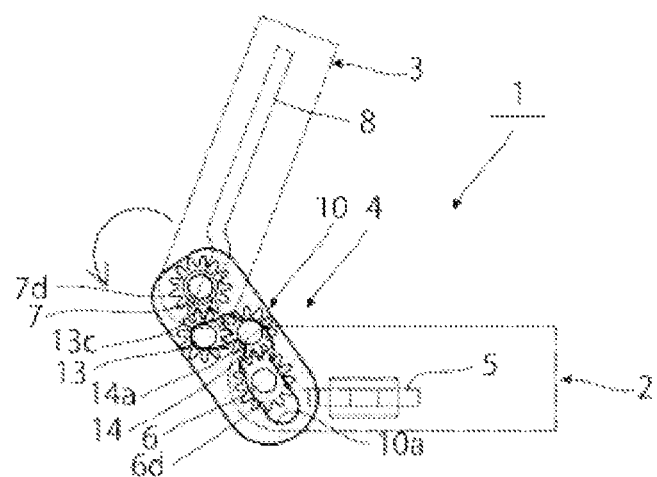
Figure 12C:
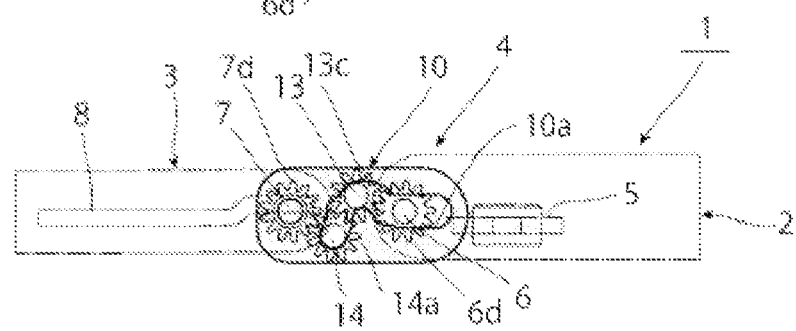
Figure 12D:
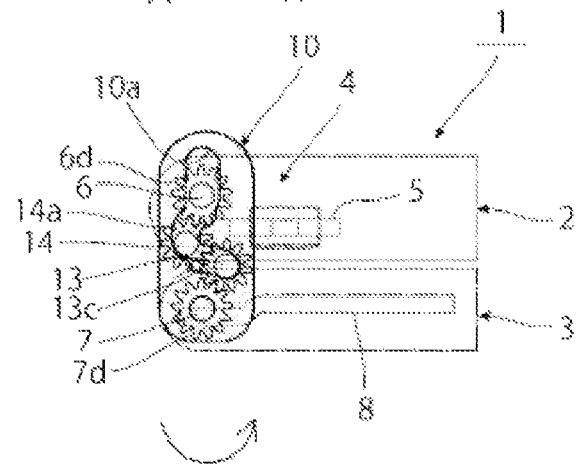

In this case, the raising/lowering-type biaxial hinge 4 according to the invention functions in the same manner as an ordinary biaxial hinge, when the second casing 3 is opened as shown in FIG. 12C from the closed state of the first casing 2 and the second casing 3 shown in FIG. 12A, the fixed hinge shaft 7 attached to the second casing 3 is rotated, here the rotation drive force is transmitted via the second gear portion 7d to the third gear portion 3c provided on the first displaceable rotary shaft 13, then to the fourth gear portion 14a of the second displaceable rotary shaft 14 meshed with the third gear portion 13c, and to the movable hinge shaft 6 comprising the first gear portion 6d meshed with the fourth gear portion 14a; as the movable hinge shaft 6 is rotated in a direction contrary to the fixed hinge shaft 7, the first casing 2 and the second casing 3 are opened from the closed state at 0 degree e.g. to 80 degrees, 180 degrees and 360 degrees, respectively as shown in FIGS. 12B, 12C, 12D; these casings are stopped at any opening angle by the second friction torque generation mechanism F2, the third friction torque generation mechanism F3, the fourth friction torque generation mechanism F4 and the first friction torque generation mechanism F1 of the friction torque generation mechanisms F provided on respective shafts (the fixed hinge shaft 7, the first displaceable rotary shaft 13, the second displaceable rotary shaft 14 and the movable hinge shaft 6) to assure the operable state. When the first casing 2 and the second casing 3 once opened 360 degrees are closed, the movement contrary to what is described above takes place, the first casing 2 and the second casing 3 are closed to 0 degree at the beginning.

Next, reference is made to the operation of the raising/lowering-type biaxial hinge 4 according to the invention, in case that the terminal device is used like a notebook PC, using the keyboard panel prepared separately from the dual-screen foldable tablet-type terminal device.

As shown in FIGS. 13A to 13C, the reference numeral 1a denotes the dual-screen foldable tablet-type terminal device with the keyboard panel 21. The dual-screen foldable tablet-type terminal device 1a with the keyboard panel 21 is normally used simply as the dual-screen foldable tablet-type terminal device, but as shown in FIGS. 14A to 14C, it is configured to enable inputs by key operations as in a notebook PC, with the separately prepared keyboard panel 21 being placed on the first casing 2, the keyboard panel 21 and the first display portion 2a and/or the second display portion 3a can communicate with each other using proximity wireless communication such as Bluetooth®.

When the operator finishes inputting by key operations on the keyboard panel 21 and removes the keyboard panel 21 from the first casing 2, it can be used again as it is as the dual-screen foldable tablet-type terminal device; when he carries the keyboard panel 21 together with him to move, he can carry the keyboard panel 21 as placed between the first casing 2 and the second casing 3 to make it compact and to prevent the keyboard panel 21. Therefore, in this case it is necessary to ensure that the second casing 3 can be closed as the keyboard panel 21 is placed on the first casing 2. In such case, when the second casing 3 is closed toward the keyboard panel 21, the rear end portion of the second casing 3 abuts against the rear end portion of the keyboard panel 21.

When the second casing 3 is further closed toward the first casing 2 or the keyboard panel 21 from this state, the movable hinge shaft 6 and the fixed hinge shaft 7 are under the force for pulling them vertically, the raising/lowering-type biaxial hinge 4 slides downward, as its case portion A as well as the second casing 3 are lifted upward together with the fixed hinge shaft 7, and the movable hinge shaft 6 moves inside the guide long hole 9a and the bent guide long holes 10a, 11a, 12a provided respectively on the first coupling member 9 and on the second A coupling member 10, the second B coupling member 11 and the second C coupling member 12. Due to this movement, a gap corresponding to the thickness of the keyboard panel 21 is generated between the first casing 2 and the second casing 3, so that the first casing 2 and the second casing 3 can be closed, as shown in FIG. 14A.

Figure 14A:
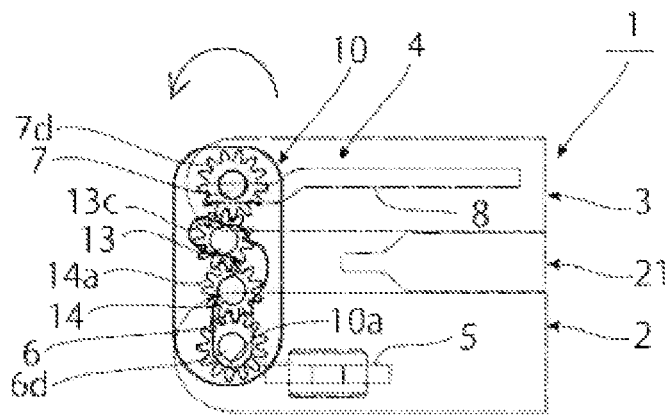
FIG. 14A to FIG. 14C are illustrative views showing an operation of a raising/lowering-type biaxial hinge according to the invention in case of a terminal device as shown in FIGS. 13A to 13C, FIG. 14A showing a closed state in which a first casing and a second casing are at 0 degree, FIG. 14B a state in which they are opened 80 degrees, and FIG. 14C a state in which they are opened 180 degrees.
Figure 14B:
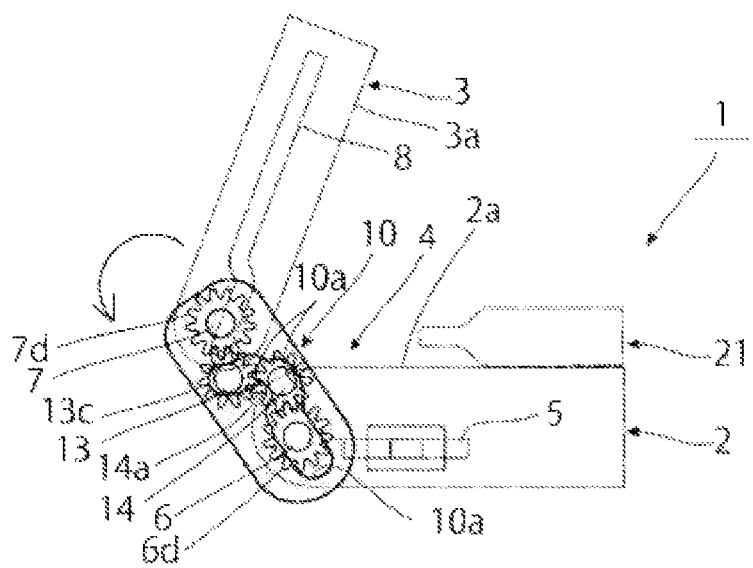
Figure 14C:
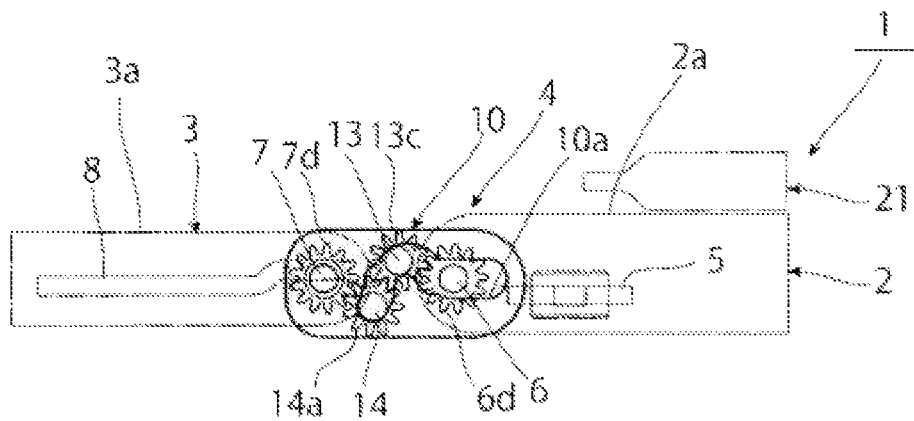

In other words, when the second casing 3 is closed relative to the first casing 2, the movable hinge shaft 6 and the fixed hinge shaft 7 are under the force for extending the shaft-to-shaft distance between them; therefore, the first displaceable rotary shaft 13 and the second displaceable rotary shaft 14 are coupled by respective coupling members 15, 15, 15, 15, so that these shafts move obliquely downward inside the bent guide long holes 10a, 11a, 12a of the second A coupling member 10, the second B coupling member 11 and the second C coupling member 12, as shown in FIG. 14A. In this manner, the raising/lowering-type biaxial hinge 4 with the first casing 2 and the second casing 3 being closed as the keyboard panel 21 placed between them is equally in the state shown in FIG. 14A.

At the same time, the synchronous rotation mechanism C moves, and in this case the rotation of the fixed hinge shaft 7 is transmitted to the movable hinge shaft 6.

When the second casing 3 closed as described above is opened again, the raising/lowering-type biaxial hinge 4 restores its original state from the predetermined opening and closing angle, as shown in FIGS. 14B and 14C.

Furthermore, when the keyboard panel 21 is removed from the upper surface of the first casing 2, the raising/lowering-type biaxial hinge 4 itself descends to resume its original shape of dual-screen foldable tablet 1 and the raising/lowering-type biaxial hinge 4 restore its original state.

As stated in the foregoing, a raising/lowering-type biaxial hinge according to the invention is suitably used as a hinge for opening and closing an ordinary dual-screen foldable tablet or a dual-screen foldable tablet comprising a separate keyboard panel; it further makes it possible to provide a dual-screen foldable tablet using such a raising/lowering-type biaxial hinge as well as a dual-screen foldable tablet comprising an attachable and detachable keyboard panel; and it is further suitably used as a hinge for a terminal device equally varying its thickness depending on its applications.

What is claimed is:

1. A raising/lowering-type biaxial hinge composed of:
   a movable hinge shaft attached to a first casing;
   a fixed hinge shaft attached to a second casing;
   a first coupling member for movably coupling said movable hinge shaft and for rotatably bearing said fixed hinge shaft at a fixed position;
   a plurality of second coupling members, each of the plurality of second coupling members having a first aperture for rotatably bearing said movable hinge shaft at a shift position and for movably coupling a first displaceable rotary shaft and a second displaceable rotary shaft slidably provided between said movable hinge shaft and said fixed hinge shaft, each of the plurality of second coupling members having a second aperture for rotatably bearing said fixed hinge shaft;
   a plurality of third coupling members for coupling said movable hinge shaft and said first displaceable rotary shaft, said first displaceable rotary shaft and said second displaceable rotary shaft, and said second displaceable rotary shaft and said fixed hinge shaft to avoid changes in respective shaft-to-shaft distances thereof; and
   a synchronous rotation mechanism for synchronously rotating said movable hinge shaft, said fixed hinge shaft, said first displaceable rotary shaft, and said second displaceable rotary shaft.

2. The raising/lowering-type biaxial hinge according to claim 1, wherein a guide long hole into which said movable hinge shaft is slidably inserted and a first bearing hole in which said fixed hinge shaft is rotatably borne are provided on said first coupling member.

3. The raising/lowering-type biaxial hinge according to claim 1, wherein bent guide long holes into which said movable hinge shaft is slidably inserted and a second bearing hole in which said fixed hinge shaft is borne are provided on each of said second coupling members.

4. The raising/lowering-type biaxial hinge according to claim 1, wherein a shaft-to-shaft distance stabilizing mechanism is provided, wherein said shaft-to-shaft distance stabilizing mechanism is made up of a pair of hook members attached to said first displaceable rotary shaft and engaged with said fixed hinge shaft.

5. The raising/lowering-type biaxial hinge according to claim 1, wherein said synchronous rotation mechanism is made up of gears provided on said movable hinge shaft and said fixed hinge shaft as well as on said first displaceable rotary shaft and said second displaceable rotary shaft, and meshed with each other.

6. The raising/lowering-type biaxial hinge according to claim 1, wherein friction torque generation mechanisms are respectively provided on said movable hinge shaft, said fixed hinge shaft, said first displaceable rotary shaft, and said second displaceable rotary shaft.

7. The raising/lowering-type biaxial hinge according to claim 6, wherein each of said friction torque generation mechanisms comprises friction washers and disc springs.

8. A terminal device using a raising/lowering-type biaxial hinge according to claim 1.

* * * * *